(12) United States Patent
Brown, Jr.

(10) Patent No.: US 6,576,697 B1
(45) Date of Patent: Jun. 10, 2003

(54) MALLEABLE HIGH DENSITY POLYMER MATERIAL

(76) Inventor: Thayer A. Brown, Jr., 4314 Huron Dr., Midland, MI (US) 48540

( * ) Notice: Subject to any disclaimer, the term of this patent is extended or adjusted under 35 U.S.C. 154(b) by 0 days.

(21) Appl. No.: 09/388,970

(22) Filed: Sep. 2, 1999

Related U.S. Application Data

(60) Provisional application No. 60/098,832, filed on Sep. 2, 1998.

(51) Int. Cl.$^7$ .............................. C08K 3/08; F42B 10/00
(52) U.S. Cl. .................. 524/401; 524/406; 524/408; 524/424; 524/435; 524/543; 524/528
(58) Field of Search .................. 524/424, 401, 524/406, 408, 435, 543, 528; 102/517

(56) References Cited

U.S. PATENT DOCUMENTS

| | | | |
|---|---|---|---|
| 4,949,645 A | 8/1990 | Hayward et al. | 102/517 |
| 5,399,187 A | 3/1995 | Mravic et al. | 75/228 |
| 5,786,416 A | 7/1998 | Gardner et al. | 529/440 |
| 6,152,835 A | * 11/2000 | Sullivan et al. | 473/373 |

* cited by examiner

*Primary Examiner*—Peter D. Mulcahy
(74) *Attorney, Agent, or Firm*—Reising, Ethington, Barnes, Kisselle & Learman, P.C.

(57) ABSTRACT

A malleable high density polymer material having a high density metal component and a polymer phase consisting of a rigid or hard component, and an elastomeric modifier for the hard component, and where the elastomeric component is chosen from one of several narrow molecular weight distribution ethylene/alpha-olefin elastomers. One advantage of the present invention is to achieve a surprisingly malleable, high density material that has unusual melt properties which may be used as a lead substitute in the making of for example, projectiles, shot, or angling weights. Another advantage of the present invention is to provide a lead substitute that is non-toxic.

22 Claims, No Drawings

MALLEABLE HIGH DENSITY POLYMER MATERIAL

REFERENCE TO CO-PENDING PATENT APPLICATION

This application claims the benefit of U.S. Provisional Patent Application Ser. No. 60/098,832 filed on Sept. 2, 1998.

FIELD OF THE INVENTION

This invention relates to materials having a high density as are used in practical applications where conventionally high specific gravity materials such as lead have been used. More specifically, the invention relates to a malleable high density polymer material particularly useful for projectiles for firearms and angling weights.

BACKGROUND OF THE INVENTION

Lead projectiles, lead shots, and angling weights are claimed to pose significant hazards. Ingestion of such lead by wildlife has been said to pose problems.

In order to avoid the use of lead, various attempts have been made to produce effective, lead-free shot pellets, bullets and angling weights.

Various approaches have been used to produce shot pellets, bullets and angling weights that are non-toxic and lead-free. Some of these are described in U.S. Pat. No. 5,786,416 to Gardner, et al; U.S. Pat. No. 4,949,645 to Hayward, et al; and U.S. Pat. No. 5,399,187 to Mravic, et al.

SUMMARY OF THE INVENTION AND ADVANTAGES

According to the present invention, there is provided a malleable high density polymer material comprising:

a. a high density metal component; and b. a polymer phase consisting of a rigid or hard component, and an elastomeric modifier for the hard component, and where the elastomeric component is chosen from one of several narrow molecular weight distribution ethylene/alpha-olefin elastomers.

Accordingly, one advantage of the present invention is to achieve a surprisingly malleable, high density material that has unusual melt properties which may be used as a lead substitute in the making of for example, projectiles, shot, or angling weights.

Another advantage of the present invention is to provide a lead substitute that is non-toxic.

DETAILED DESCRIPTION OF THE INVENTION AND PREFERRED EMBODIMENTS GENERAL DESCRIPTION

A malleable high density material with unusual melt processing properties may be prepared by combining a high density metal or metals with a polymer system comprising:

a. a base polyolefin such as polypropylene; and b. a narrow molecular weight distribution ethylene/alpha-olefin elastomer such as Engage™ (Dupont Dow Elastomers).

Appropriate stabilizers, compatibilizers or dispersion aids, mold release agents, etc., may also be included. By choosing non-toxic components with suitable densities, materials may be produced that have physical characteristics very similar to lead but are non-toxic and are useful for applications such as firearm projectiles (shot and bullets) and angling weights.

The use of narrow molecular weight distribution ethylene/alpha-olefin elastomer as a component in the polymer phase provides unique melt processing characteristics and malleability to the metal/polymer composites. In a molten state, these compositions exhibit very little melt flow when tested under low shear test conditions (such as an ASTM D 1238-90b, 230° C, 2.16 kg, melt indexer) but flow surprisingly well when processed at high shear rates encountered in a normal injection molding machine. In a solid state, these compositions are highly malleable. They may be hammered, squeezed, or otherwise be formed to a desired shape without loosing the prestressed material integrity.

COMPONENTS

The high density phase or component of the composite may consist of any one of or combinations of suitably dense metals. Iron, nickel, tin, bismuth, cobalt, tungsten, and tungsten carbide are examples. These metals may be used in various states of refinement and their alloys and oxides may also be used. An important characteristic is that they be non-toxic. Useful ranges and combinations are such that, when combined with the polymer phase, the desired composite density is achieved. Generally, a target composite density for a lead substitute is in the range of 5 g/cc to 13 g/cc and preferably 8 g/cc to 12 g/cc. A corresponding metal phase weight percentage would then be about 70% to 96%.

The polymer phase consists of a rigid or hard component, an elastomeric modifier for the hard component, and preferably, additives. The hard component is chosen for its toughness, ability to bind the high density metal phase, and compatibility with the narrow molecular weight distribution ethylene/alpha-olefin elastomer. Suitable polymers would include olefins, olefin copolymers, ethylene vinyl acetate, and other polymers compatible with narrow molecular weight distribution ethylene/alpha-olefin elastomers. Examples are polyethylene, polypropylene, and their copolymers.

The elastomeric component is chosen from one of several narrow molecular weight distribution ethylene/alpha-olefin elastomers. These polymers are generally prepared with metallocene single site constrained geometry catalyst or similar catalyst technology that provides precise control of molecular weight and chain branching as cited in U.S. Pat. Nos. 5,272,236; 5,278,272; 5,798,420; and 5,580,939. Examples of these products are the Engage™ series of products sold by Dupont Dow Elastomers and Exact™ products sold by Exxon Chemical Corporation. The ratio of rigid polymer to elastomer can be varied to control the melt processing characteristics and final properties of the final product. Weight ratios of rigid polymer/elastomer of about 90/10 to 30/70 are most useful. As the proportions of elastomer increase, the composite takes on more of the Theological and malleable characteristics described.

Additives that are included in the composite are those materials normally utilized in polymer formulating technology to impart desirable characteristics to the material during manufacturing, processing, and end use. Examples of these include heat stabilizers such as di-tertiary butyl phenol, oxidative stabilizers such as tris-nonylphenyl phosphite, dispersion aids such as silanes or titanates, mold release agents such as waxes and stearates.

As described above, the relative proportions of the major components of the compositions of this inventions may vary within certain preferred ranges, depending upon the physical properties of the individual material employed in the overall balance of properties required of the composition.

The compositions of this invention may be manufactured by conventional methods as are well known to persons skilled in the art. Also, because the material described may be processed by any conventional plastics forming process, it is possible to produce a variety of shapes for different uses.

EXAMPLE 1

The following components were weighed into a plastic bag:

| Component No. | Description | Weight |
| --- | --- | --- |
| (1) | Tungsten powder, 5–6 micron | 3683.6 g. |
| (2) | Tungsten concentrate | 104 g. |
| (3) | Engage 8400 | 60 g. |
| (4) | 6301 polypropylene | 140 g. |
| (5) | CAPOW L-12R | 12 g. |
| (6) | Inganox B-225 | 0.4 g. |

The various components are commercially available from the following:

| Component No. | Manufacturer |
| --- | --- |
| (1) | Teledyne Advanced materials |
| (2) | Avocet Tungsten, Inc. |
| (3) | Dupont Dow Elastomers |
| (4) | Montell Polyolefins Corporation |
| (5) | Kenrich Petrochemical Company |
| (6) | Ciba Specialty Chemicals Corporation |

The ingredients were combined and shaken to mix them thoroughly to achieve a substantially uniformly distributed mixture of ingredients. The mixed ingredients were poured into the feed hopper of a single screw extruder. The extruder was set up as follows: Killion brand, L/D=32/1, vented, 2 stage mixing screw, temperatures set at (325° F.—feed, Z2—350° F., Z3—430° F., Z4—350° F., die—430° F.0, 50 RPM, two hole strand die. The blended components were extruded, cooled in a water bath, and pelletized. The pellets were tested for melt flow rate according to ASTM D 1238-90b, 230° C. 2.16 kg. The value obtained was 10.8, which is an extremely low volume for a material intended for injection molding.

EXAMPLE 2

The finished pellets, according to Example 1, were injection molded at 430° F. into nominal 0.140 inch balls on a 50 ton Cincinnati molding machine which contained a 384 cavity ball mold. The molding conditions (temperatures, pressures, speeds, etc.) were normal for polypropylene-based compounds. The 384 cavity unbalanced 7-branch tree mold filled well. The processing characteristics of the material were judged to be excellent. The molding drops were tumbled for thirty minutes to free the balls from the runners. The finished shot had a density of 8.98 g/cc.

Individual balls were tested for malleability by placing them on a steel anvil and striking them with a hammer. The same test was done on commercial lead shot. Both the composite and lead shot flattened similarly. However, the lead shot exhibited tears around the edge of the resulting disk. The composite shot did not display tears. When the disks were flexed, the lead broke after a couple of flexings. The composite sample continued to remain flexible and tough after multiple flexings.

The finished shot was loaded into shotgun cartridges and test fired at thirty yards into a steel patterning circle and into wet and dry telephone books. Patterning performance was similar to similarly loaded lead loads. Deformation of recovered pellets recovered from the telephone books was also similar to lead.

EXAMPLE 3

The following formulation was prepared through the extrusion step as in Example 1:

| Component No. | Description | Weight |
| --- | --- | --- |
| (1) | Tungsten powder, 5–6 micron | 3280 g. |
| (3) | Engage 8400 | 50.28 g. |
| (4) | 6301 polypropylene | 117.32 g. |
| (5) | CAPOW L-12H | 12 g. |
| (6) | Inganox B-225 | 0.4 g. |

The resulting pellets were injection molded at 450° F. into 0.125 inch thick×0.5 inch×6.5 inch dog bone shaped tensile test bars. The density of the sample was 9.9 g./cc. The bars were then hammered into a thin sheet. The thin sheet retained its flexibility and toughness.

When the material of this invention was processed to form ammunition (shot) for a firearm, it retained a matte finish with at least some surface texture even after some polishing operations were performed on the shot. During testing, when this shot was fired at and struck various fowl, it was observed that the shot had vastly improved properties over steel shot. Notably, shot formed from the high density composite material of this invention proved to have greater "shocking" or "killing" power upon impact with the fowl. The hard, steel shot tended to pass relatively cleanly through the fowl, often without inflicting a wound sufficient to stop or kill the fowl. In contrast, the shot formed from the material of this invention caused more damage or injury to the fowl to increase the likelihood of stopping or killing the fowl.

While not intending to be held to any particular theory, it is currently believed that the malleability of the shot, in combination with its surface texture, accounts for the increased "killing" power of the shot formed from the material of this invention. It is believed that the malleability of the shot enables at least some deformation of the shot upon impact similar to lead shot and that the surface texture causes the shot to "grab" or pull feathers of the fowl as the shot impacts and penetrates the fowl. Thus, these properties of the shot are believed to increase the damage or injury to the fowl on impact to prevent the shot from passing cleanly through the fowl like steel shot. Whatever the theoretical explanation, testing of the improved shot formed from the material of the present invention showed the increased shocking or killing power discussed above as compared to steel shot.

What is claimed is:

1. A malleable, high density composite material comprising:
    a high density metal component comprising from 70 to 96 weight percent of the composite material based on an overall weight of the composite material;
    a polymer phase comprising a blend of polymers having a hard component and an elastomeric component of a narrow molecular weight distribution ethylene/alpha-olefin elastomer.

2. The material of claim 1, wherein the material has a density of between 5 to 13 g/cc.

3. The material of claim 1, wherein the hard component is a polymer selected from the group consisting of olefins, olefin copolymers, ethylene vinyl acetate, polyethylene, polypropylene, copolymers of polyethylene and copolymers of polypropylene.

4. The material of claim 1, wherein the elastomeric component is prepared with a metallocene catalyst.

5. The material of claim 4, wherein the elastomeric component is prepared with a metallocene single site constrained geometry catalyst.

6. The material of claim 4, wherein the elastomeric component is a polyolefin elastomer.

7. The material of claim 4, wherein the elastomeric component is an ethylene based plastomer.

8. The material of claim 1, wherein the weight ratio of the hard component to the elastomeric component is between 90:10 to 30:70.

9. The material of claim 1, which also comprises a heat stabilizer.

10. The material of claim 9, wherein the heat stabilizer is di-tertiary butyl phenol.

11. The material of claim 1, which also comprises an oxidative stabilizer.

12. The material of claim 11, wherein the oxidative stabilizer is tris-nonylphenyl phosphite.

13. The material of claim 1, which also comprises a dispersion aiding component.

14. The material of claim 13, wherein the dispersion component is selected from the group consisting of silanes and titanates.

15. The material of claim 1, which also comprises a mold release agent.

16. The material of claim 15, wherein the mold release agent is a wax.

17. The material of claim 15, wherein the mold release agent is a stearate.

18. The material of claim 1, wherein the metal component is present in the material at a weight percentage of between 70% and 96% and has a density such that the overall material density is between 5 g/cc and 13 g/cc.

19. The material of claim 18, wherein the metal component is at least one of iron, tin, nickel, bismuth, cobalt, tungsten, tungsten carbide and alloys and oxides thereof.

20. The material of claim 19, wherein the metal component is tungsten carbide having tungsten, carbon and cobalt components.

21. A firearm ammunition comprising:

a high density metal component comprising from 70 to 96 weight percent of the firearm ammunition based on an overall weight of the firearm ammunition;

a polymer phase comprising a blend of polymers having a hard component and an elastomeric component of a narrow molecular weight distribution ethylene/alpha-olefin elastomer.

22. The firearm ammunition of claim 21, wherein the firearm ammunition has a matte surface finish with at least some surface texture.

* * * * *